(12) United States Patent
Wei et al.

(10) Patent No.: US 10,306,032 B2
(45) Date of Patent: May 28, 2019

(54) BRACKET ASSEMBLY, CAMERA MODULE, AND MOBILE TERMINAL

(71) Applicant: GUANGDONG OPPO MOBILE TELECOMMUNICATIONS CORP., LTD., Dongguan, Guangdong (CN)

(72) Inventors: Yi Wei, Guangdong (CN); Yong Li, Guangdong (CN); Peiju Chen, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/830,218

(22) Filed: Dec. 4, 2017

(65) Prior Publication Data

US 2018/0176351 A1 Jun. 21, 2018

(30) Foreign Application Priority Data

Dec. 20, 2016 (CN) .......................... 2016 1 1185478

(51) Int. Cl.
*H01R 12/00* (2006.01)
*H04M 1/02* (2006.01)
(Continued)

(52) U.S. Cl.
CPC ........ *H04M 1/0264* (2013.01); *H04N 5/2257* (2013.01); *H04N 5/2252* (2013.01); *H04N 5/247* (2013.01)

(58) Field of Classification Search
None
See application file for complete search history.

(56) References Cited

U.S. PATENT DOCUMENTS 7,128,607 B2 * 10/2006 Li ...................... H01R 13/6594
439/607.36
7,255,600 B2 * 8/2007 Ma ........................ H01R 12/62
348/E5.027
(Continued)

FOREIGN PATENT DOCUMENTS

CN 201075507 Y 6/2008
CN 101772251 A 7/2010
(Continued)

OTHER PUBLICATIONS

Non-English International Search Report and Written Opinion dated Sep. 22, 2017 for Application No. PCT/CN2017/079595.
(Continued)

*Primary Examiner* — Tuan A Tran
(74) *Attorney, Agent, or Firm* — Ladas & Parry LLP (57) ABSTRACT

A bracket assembly is provided. The bracket assembly includes a metal bracket and a spring module. The metal bracket is configured to support an electronic component in a mobile terminal. The spring module includes a fixing portion, a pressing portion, and a elastic portion; the fixing portion is fixed in the mobile terminal and grounded, and the elastic portion connects the pressing portion and the fixing portion; the elastic portion is configured to provide a restoring force to the pressing portion, and press the pressing portion to be in contact with the metal bracket. A camera module and a mobile terminal are also provided.

20 Claims, 9 Drawing Sheets

(51) Int. Cl.
*H04N 5/225* (2006.01)
*H04N 5/247* (2006.01)

(56) References Cited

U.S. PATENT DOCUMENTS

| | | | | |
|---|---|---|---|---|
| 7,374,431 B2* | 5/2008 | Su | ............ | H04N 5/2254 348/E5.028 |
| 7,609,962 B2* | 10/2009 | Chen | ............ | H04N 5/2257 348/373 |
| 7,802,996 B2* | 9/2010 | Kusaki | ............ | G02B 13/001 439/76.1 |
| 8,011,934 B2* | 9/2011 | Tu | ............ | H04M 1/0264 439/67 |
| 8,085,344 B2* | 12/2011 | Mizumura | ............ | H01R 13/639 348/374 |
| 8,139,145 B2* | 3/2012 | Ryu | ............ | H04N 5/2253 348/342 |
| 8,279,335 B2* | 10/2012 | Cao | ............ | H04N 5/2257 250/239 |
| 8,801,439 B2* | 8/2014 | Sato | ............ | H01R 13/22 439/342 |
| 9,077,881 B2* | 7/2015 | Lee | ............ | H04N 5/2257 |
| 9,134,503 B2* | 9/2015 | Topliss | ............ | G02B 27/646 |
| 9,179,055 B2* | 11/2015 | Hooton | ............ | H04N 5/2252 |
| 9,395,602 B2* | 7/2016 | Havskjold | ............ | G03B 17/02 |
| 9,473,681 B2* | 10/2016 | Hoelter | ............ | H04N 5/2252 |
| 9,591,196 B2* | 3/2017 | Park | ............ | G03B 3/10 |
| 9,723,228 B2* | 8/2017 | Boulanger | ............ | H04N 5/33 |
| 9,766,534 B2* | 9/2017 | Havskjold | ............ | G03B 17/02 |
| 9,961,277 B2* | 5/2018 | Hoelter | ............ | H04N 5/33 |
| 9,973,669 B2* | 5/2018 | Vittu | ............ | H04N 5/2253 |
| 10,122,923 B2* | 11/2018 | Jung | ............ | G02B 7/08 |
| 2011/0177712 A1 | 7/2011 | Tu | | |
| 2011/0266018 A1 | 11/2011 | Duan et al. | | |

FOREIGN PATENT DOCUMENTS

| | | |
|---|---|---|
| CN | 102131057 A | 7/2011 |
| CN | 202268521 U | 6/2012 |
| CN | 102544841 A | 7/2012 |
| CN | 105187697 | 12/2015 |
| CN | 105356077 A | 2/2016 |
| CN | 105522687 | 4/2016 |
| CN | 105636383 A | 6/2016 |
| CN | 105828511 A | 8/2016 |
| CN | 105896126 A | 8/2016 |
| EP | 2555526 | 6/2013 |
| WO | 2017020751 | 9/2017 |

OTHER PUBLICATIONS

English abstract of CN 105356077 A.
English abstract of CN 105828511 A.
English abstract of CN 105896126 A.
English abstract of CN 201075507 Y.
English translation of the Abstract of CN105522687.
English translation of the Abstract of CN105187697.
English translation of the Abstract of WO2017020751.
Search Report issued in European Patent Application No. 17209018.5.
Chinese Office Action with English translation dated Feb. 1, 2019 for Application No. CN 201611185478.1.

* cited by examiner

BRACKET ASSEMBLY, CAMERA MODULE, AND MOBILE TERMINAL

CROSS-REFERENCE TO RELATED APPLICATIONS

This application claims all benefits accruing under 35 U.S.C. § 119 from China Patent Application No. 201611185478.1, filed on Dec. 20, 2016 in the State Intellectual Property Office of China, the contents of which are hereby incorporated by reference.

FIELD

The present disclosure relates to the field of mobile device, and particularly relates to a bracket assembly, a camera module, and a mobile terminal.

BACKGROUND

With the development of smart phones, the electronic component within mobile phones, such as camera device, is often supported by a bracket. Considering the rigid requirement, the exact requirement of size, and installation requirement, the material of the bracket often adopts metal to stabilize the electronic component. However, the metal is conductive, thus metallic bracket is easily interfered with the electromagnetic signal generated by the communication element inside the mobile phone. Therefore, the communication performance of the communication elements is decreased.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

The embodiments of the present invention are described in detail below, examples of which are shown in the accompanying drawings. The embodiments described below with reference to the accompanying drawings are exemplary and are intended to be illustrative of the invention and are not to be construed as limiting the invention.

In the description of the present invention, it can be understood that, the terms "center", "upper", "down", "front", "rear", "left", "right", "vertical", "top", "bottom", "inside", "outside", "surrounding" are based on the azimuth or the positional relationship shown in the drawings. The terms are used for the purpose of facilitating the description of the invention and simplified description. Rather than indicating that the device or element must have a specific orientation, constructed and operated in a particular orientation, and therefore cannot be construed as limiting the invention.

It should be noted that the mobile terminal may be a mobile phone, a tablet computer, a notebook computer, or the like. The bracket assembly and the camera module may be used on the mobile terminal. The bracket assembly is assembled in the mobile terminal. A communication element can be located in the mobile terminal, and configured to receive or transmit a signal.

Figure 1:
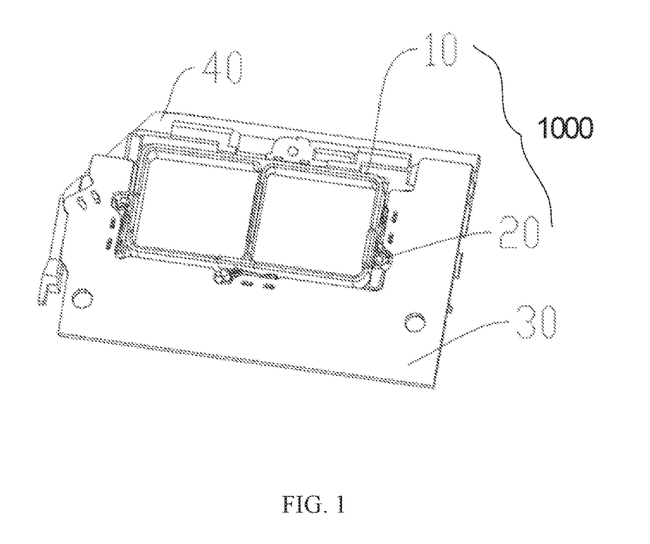
FIG. 1 shows a schematic view of one embodiment of a bracket assembly.
Figure 2:
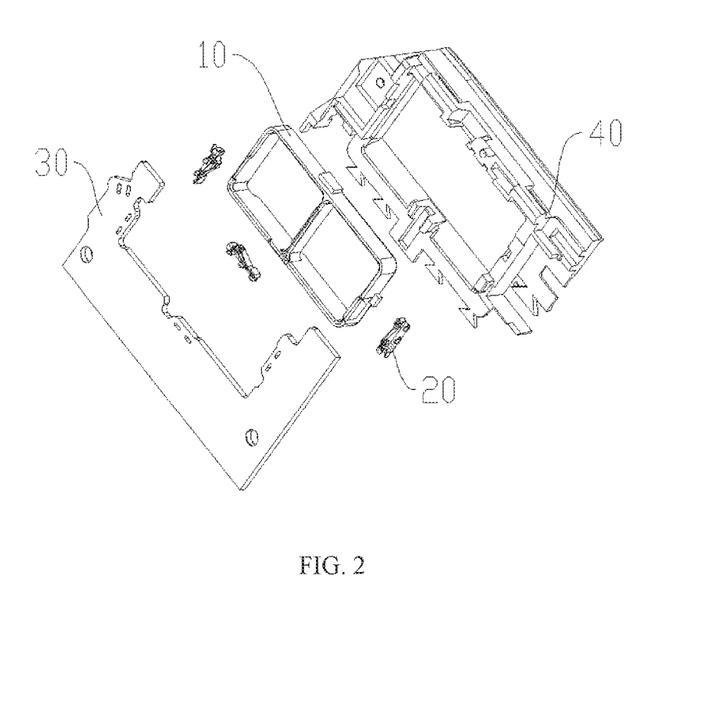
FIG. 2 shows a schematic exploded view of one embodiment of the bracket assembly.

Referring to FIGS. 1-2, one embodiment of a bracket assembly 1000 comprises a metal bracket 10 and a spring module 20. The bracket assembly 1000 can be located on a main plate 30, and the main plate 30 can be fixed to a middle frame 40. Thus the bracket assembly 1000 can be fixed between the main plate 30 and the middle frame 40. In one embodiment, the metal bracket 10 can be embedded in the middle frame 40, and the spring module 20 can fix the metal bracket 10 to the main plate 30. The metal bracket 10 is configured to support an electronic component in a mobile terminal. In one embodiment, the electronic component can be a dual-camera component.

Figure 3:
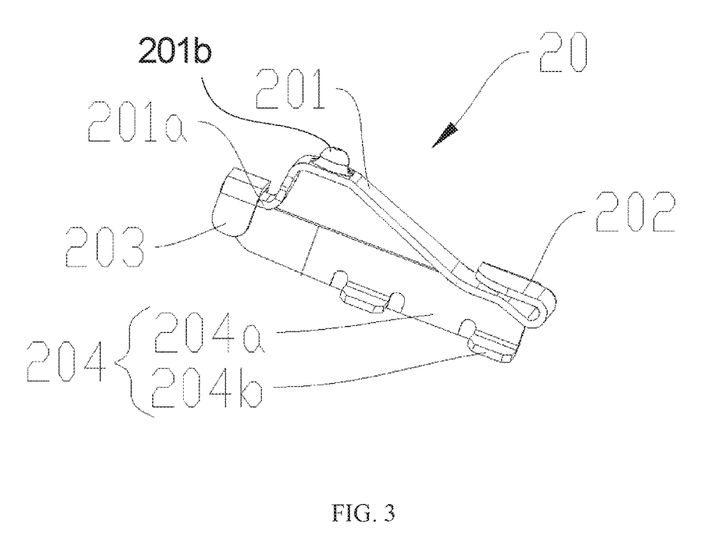
FIG. 3 shows a schematic view of one embodiment of a spring module.

Further referring to FIG. 3, the spring module 20 comprises a pressing portion 201, an elastic portion 202, and a fixing portion 204. The pressing portion 201 can extend along the fixing portion 204. The elastic portion 202 connects the pressing portion 201, and the pressing portion 201 and the elastic portion 202 can be an integrated structure. The elastic portion 202 can be a bent structure, and the elastic portion 202 bends toward a direction away from the fixing portion. The fixing portion 204 can be fixed to the main plate 30 and connected to a ground electrode of the main plate 30. The elastic portion 202 connects the pressing portion 201 and the fixing portion 204, and provides a restoring force to the pressing portion 201. Thus the pressing portion 201 can be in close contact with the metal bracket 10, and then the metal bracket 10 can be grounded through the spring module 20.

The fixing portion 204 is fixed to the main plate 30 and connected to the ground through the main plate 30. The pressing portion 201 can be closely sandwiched between the metal bracket 10 and the main plate 30, and the metal bracket 10 is grounded through the main plate 30 without changing the structure of the metal bracket 10. In one embodiment, the fixing portion 204 includes a base plate 204a and a bent end 204b. The bent end 204b extends from the edges of the base plate 204a. The bent end 204b can be perpendicular with the base plate 204a. The bent end 204b can be fixed to the main plate 30. In one embodiment, there are a plurality of bent ends 204b connected to the base plate 204a, and the plurality of bent ends 204b can be bent in the same direction.

In the one embodiment, the pressing portion 201, the elastic portion 202, and the fixing portion 204 are integrally formed by bending a metal and/or a metal alloy material. The fixing portion 204, the pressing portion 201, and the elastic portion 202 are integrally molded. Thus the processing can be simplified, and the raw material can be saved.

In one embodiment, the spring module 20 further comprises a limit portion 203. The limit portion 203 can be located at one end of the base plate 204a. A limit end 201a of the pressing portion 201 is accommodated in the limit portion 203, and the elastic portion 202 is formed on a free end opposite to the limit end 201a of the pressing portion 201. The limit portion can be formed by bending one end of the base plate 204a toward a direction away from the pressing portion 201. The limit portion 203 is configured to limit the position of the pressing portion 201 and prevent the pressing portion 201 from excessive deformation without pressure. The elastic portion 202 can provide the restoring force to the pressing portion 201, so that the pressing portion 201 is in close contact with the metal bracket 10. However, before the metal bracket 10 is mounted, while the pressing portion 201 is deformed due to a large force caused by the return force, the metal bracket 10 is difficult to be mounted. The limit portion 203 restricts the moving range of the limit end 201a and prevents the pressing portion 201 from becoming excessively large.

In one embodiment, the pressing portion 201 comprises a contact point 201b. The contact point 201b protrudes out of an outer surface of the pressing portion 201, and configured to enhance the pressure between the metal bracket 10 and the main plate 30. Furthermore, the contact point 201b can be elastic with two layered structures.

Figure 4:
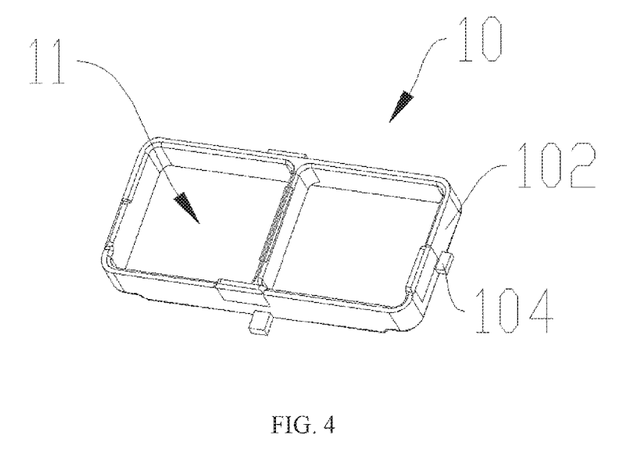
FIG. 4 shows a schematic view of one embodiment of a bracket.

Further referring to FIG. 4, in one embodiment, the metal bracket 10 comprises a plurality of sidewalls 102. The plurality of sidewalls 102 are connected end to end to form an accommodating space 11 for accommodating the electronic component. In one embodiment, the metal bracket 10 accommodates the electronic component to facilitate the installation and stabilization of the electronic component. The electronic component may be a camera module, a speaker, a fingerprint module, a connector, or the like.

Furthermore, the metal bracket 10 can be rectangular. The metal bracket 10 can be made of aluminum alloy material, silver material, or iron material. The metal bracket 10 is formed by shaping the metal block by an automatic numerical control milling process. That is, the molding dimensions of the sidewall 102 are formed by numerical control milling. Thus the dimensional accuracy of the sidewall 102 is high, the electronic component can be effectively stabilized, and the electronic component can be fixed at a precise position. Furthermore, the position of the electronic component can be easily calibrated. At the same time, the metal bracket 10 can also be effectively fixed to an external element (not shown), thus the fixing position of the metal bracket 10 is accurate and the positioning of the metal bracket 10 is facilitated. Therefore, the mounting position of the electronic component can be accurately improved. The accommodating space 11 can accommodate a plurality of electronic components, at the same time, and the plurality of electronic components can be mounted at the same time. Thus the metal bracket 10 can fix the plurality of electronic components to save space.

In one embodiment, a plurality of spring modules 1000 can be applied in the mobile terminal. The plurality of the spring modules 20 are distributed around the plurality of sidewalls 102. In detail, each of the plurality of sidewalls 102 has one spring module 20 located on an outside of the sidewall 102 opposite to the accommodating space 11. The pressing portion 201 resiliently abuts against a wall surface of the sidewall 102 away from the accommodating space 11. The restoring force applied by the elastic portion 202 to the pressing portion 201 causes the pressing portion 201 to come into close contact with the wall surface, to ensure that the pressing portion 201 and the metal bracket 10 can be tightly in contacted with each other. Furthermore, the spring module 20 and the metal bracket 10 can be prevented from detachment, and the structural stability of the mobile terminal can be enhanced. At the same time, the pressing portion 201 elastically contacts the wall surface of the metal bracket 10, thus the attachment and detachment of the metal bracket 10 can be facilitated. The metal bracket 10 can be pulled out along the direction perpendicular with the sidewall 102 pressed by the pressing portion 201. The metal bracket 10 can be assembled by pressing the pressing portion and inserting the metal bracket 10. Therefore, the difficulty of assembling and disassembling the metal bracket 10 is reduced.

Furthermore, the spring module 20 can be mounted between each sidewall 102 and the main plate 30. The plurality of spring modules 20 can surround the metal bracket 10, and the plurality of pressing portions 201 are either simultaneously in contact with the different positions of the wall surfaces of the metal brackets 10, or the different wall surfaces. Thus the entire metal bracket 10 is grounded, and the overall potential can be decreased. Therefore, the interference to the electromagnetic signals of the communication elements can be reduced, and the user experience can be improved. Because the plurality of contact points 201b on the plurality of pressing portions are spaced from each other, and in contact with the sidewalls 102, thus the metal bracket 10 can be grounded by the plurality of spring modules 20.

Furthermore, the number of sidewalls 102 can be even, and the plurality of contact points 201b are symmetrically distributed on each two opposite sidewalls 102. Thus the symmetrical contact points 201b uniformly ground the respective sidewalls 102 of the metal bracket 10. Therefore, the overall potential of the metal support 10 can be uniformly reduced, the interference to the electromagnetic signal of the communication element can be dramatically reduced, and the user experience can be further improved.

Figure 5:
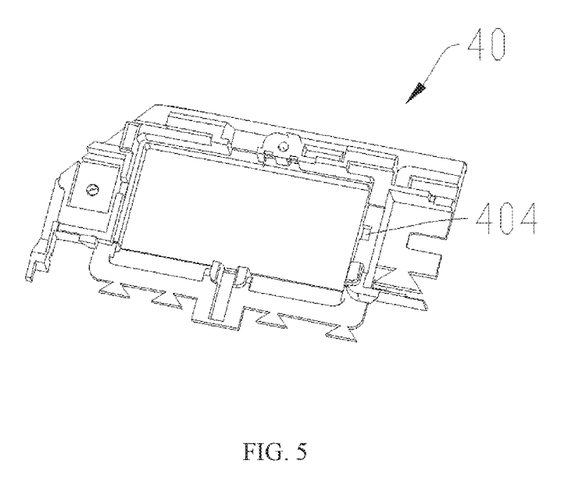
FIG. 5 shows a schematic view of one embodiment of a middle frame.

Further referring to FIG. 5, in one embodiment, the metal bracket 10 is fixed to the middle frame 40 while the bracket assembly 1000 is applied to the mobile terminal. In detail, a plurality of fixing blocks 104 is located on the wall surface of the sidewall 102 away from the accommodating space 11. Furthermore, a plurality of slots 404 is defined in the middle frame 40 for accommodating the plurality of fixing blocks 104. Thus the metal bracket 10 can be firmly installed in the middle frame 40. The plurality of fixing block 104 of the metal bracket 10 are engaged with the plurality of slots 404, thus the metal bracket 10 is securely mounted in the middle frame 40 to improve the structural stability of the mobile terminal.

Figure 6:
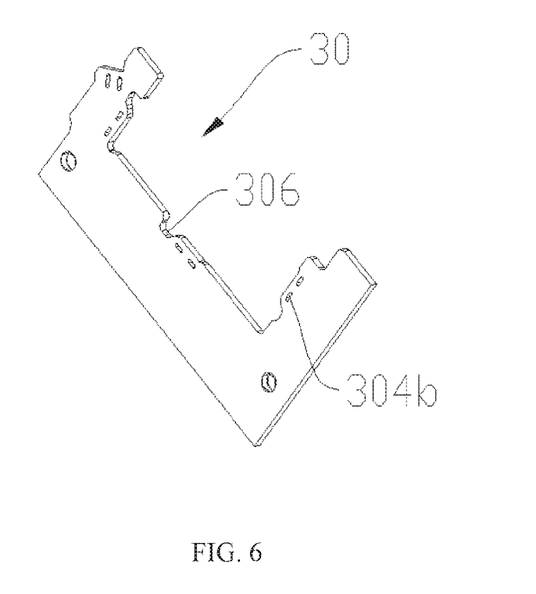
FIG. 6 shows a schematic view of one embodiment of a main plate.

Further referring to FIG. 6, the spring module 20 conducts the current of the metal bracket 10 to the ground electrode of the main plate 30. Each of the spring modules 20 can be independently and electrically connected to the ground electrode. In one embodiment, the plurality of spring modules 20 can be commonly electrically connected to the ground electrode. On one hand, the spring module 20 can reduce the overall potential of the metal support 10; on the other hand, the static electricity on the metal bracket 10 can be conducted to the ground. Thus the affection of the static electricity to the electronic component can be avoided, and the electronic component can be protected. The ground electrode can be exposed copper point on the main plate 30, and each of the spring modules 20 is mounted on the main plate 30 and contacts the exposed copper points on the main plate 30.

Furthermore, in one embodiment, a plurality of limit holes 304b is distributed on the main plate 30 corresponding to the plurality of bent ends 204b on the fixing portion 204. The plurality of bent ends 204b can be fit with the plurality of limit holes 304b, so that the spring module 20 is securely fixed to the main plate 30 to improve the structural stability of the mobile terminal. In one embodiment, the plurality of bent ends 204b can be inserted into the plurality of limit holes 304b.

Furthermore, a plurality of recesses 306 can be formed on the main plate 30. The plurality of recesses 306 can be distributed around an inner edge of the main plate 30. In one embodiment, the plurality of recesses can be formed corresponding to the plurality of limit ends 201a. The position of the plurality of recesses 306 corresponds to the plurality of limit ends 201a on the pressing portion 201, and avoids affecting the movement of the pressing portion 201. The pressing portion 201 can be changed in different states under the restoring force provided by the elastic portion 202 and the pressure applied by the metal bracket 10. While the metal bracket 10 needs to be assembled, the pressing portion 201 can be pulled in a direction away from the metal bracket 10. The pressing portion 201 is pulled in the direction toward the edge of the main plate 30. The recesses 306 can be configured to prevent the main plate 30 from interfering with the moving range of the pressing portion 201, thus the pressing portion 201 can be freely moved.

Figure 7:
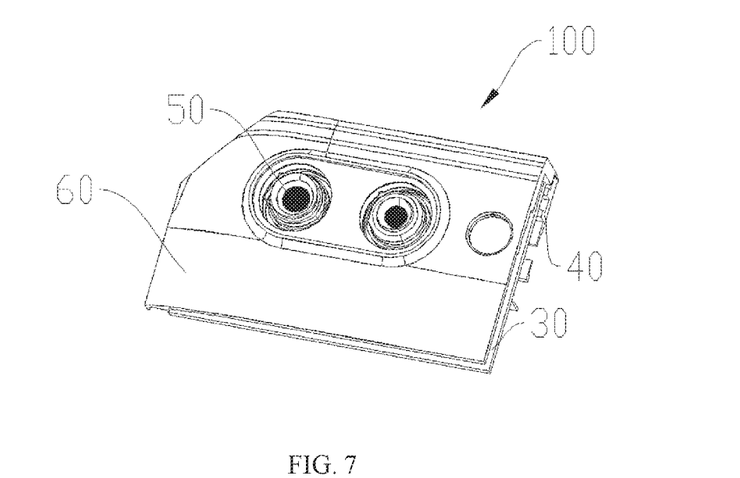
FIG. 7 shows a schematic view of one embodiment of a camera module.
Figure 8:
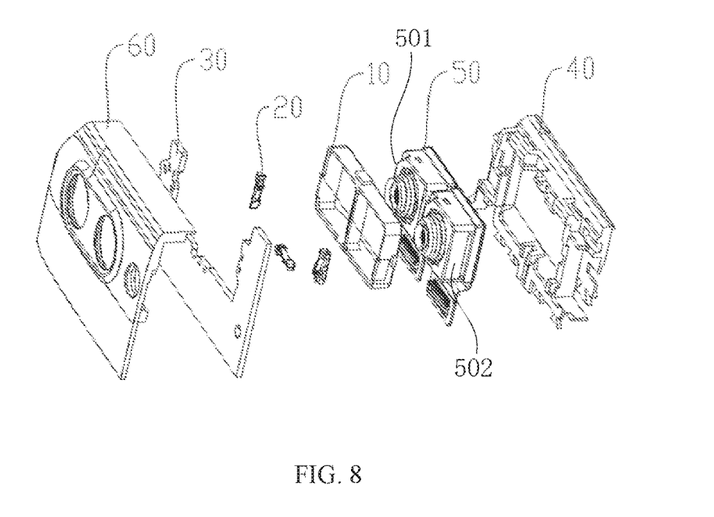
FIG. 8 shows a schematic exploded view of the camera module.

Further referring to FIGS. 7-8, one embodiment of a camera module 100 comprises a dual-camera component 50 fixed in the bracket assembly 1000. The dual-camera component 50 can be embedded in the metal bracket 10. The spring module 20 is fixed to the main plate 30. The spring module 20 can be grounded through the main plate 30. The metal bracket 10 surrounds and supports the dual-camera component 50. The fixing portion 204 is fixed to the main plate 30 and connected to the ground through the main plate 30, and the pressing portion 201 is in close contact with the metal bracket 10. The metal bracket 10 can be electrically connected to the ground without changing the mounting structure of the metal bracket 10. The plurality of spring modules 20 can cause the entire metal bracket 10 to be multi-point grounded, thus the overall potential of the metal bracket 10 is reduced, and the interference to the electromagnetic signals of the communication element can be decreased.

The dual-camera component 50 comprises a first imaging lens 501 and a second imaging lens 502 disposed side by side. The first imaging lens 501 and the second imaging lens 502 are mounted in the accommodating space 11 of the metal bracket 10 together. In one embodiment, a first main imaging optical axis of the first imaging lens 501 and a second main imaging optical axis of the second imaging lens 502 are parallel with each other. Thus the first imaging lens 501 and the second imaging lens 502 can be collaboratively operated to improve the shooting performance.

In one embodiment, the camera module 100 further comprises the middle frame 40 for fixing the metal bracket 10. The plurality of fixing blocks 104 are formed on the sidewall 102 of the metal bracket 10 away from the accommodating space 11, and the plurality of slots are formed on the middle frame 40 corresponding to the fixing block 104, thus the metal bracket 10 is mounted in the middle frame 40. The fixing block 104 can be engaged with the slot 404 so that the metal bracket 10 is securely mounted in the middle frame 40 to improve the structural stability of the camera module 100.

In one embodiment, the camera module 100 further comprises a cover 60 which is attached to the middle frame 40. The main plate 30, the metal bracket 10, the spring module 20, and the dual-camera component are sandwiched between the cover 60 and the middle frame 40. The cover 60 is capable of covering and protecting the inside communication element. The appearance performance of the mobile terminal 100 can also be improved. In one embodiment, the cover 60 is a metal plate. Furthermore, the cover 60 has two photographing windows, and the first imaging lens 501 and the second imaging lens 502 are photographed through the two photographing windows respectively.

The fixing portion 204 of the spring module 20 is fixed to the main plate 30 and connected to the ground through the main plate 30, and the pressing portion 201 is in close contact with the metal bracket 10. The metal bracket 10 is electrically connected to the ground without changing the structure of the metal bracket 10. Furthermore, the plurality of spring modules 20 cause the entire metal bracket 10 to be multi-point grounded, thus the overall potential of the metal bracket 10 is reduced, and the interference to the electromagnetic signals of the communication elements can be decreased.

Figure 9:
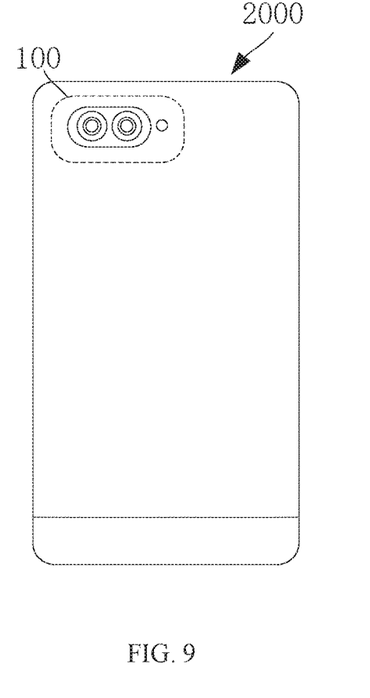
FIG. 9 shows a schematic view of one embodiment of a mobile terminal.

Further referring to FIG. 9, one embodiment of a mobile terminal 2000 comprises a shell 200 and the camera module 100 assembled in the shell 200. The camera module 100 comprises the dual-camera component 50 fixed in the bracket assembly 1000, and the dual-camera component 50 can be supported and fixed by the bracket assembly 1000. The communication element can be accommodated in the mobile terminal 2000, and the bracket assembly 1000 can prevent the communication element from interference.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and comprising the full extent established by the broad general meaning of the terms used in the claims. It will therefore be appreciated that the embodiments described above may be modified within the scope of the claims.

What is claimed is:

1. A bracket assembly comprising:
   a metal bracket, wherein the metal bracket is configured to support an electronic component in a mobile terminal;
   at least one spring module, wherein the at least one spring module comprises a fixing portion, a pressing portion, and a elastic portion; the fixing portion is fixed in the mobile terminal and grounded, and the elastic portion connects the pressing portion and the fixing portion; the elastic portion is configured to provide a restoring force to the pressing portion, and press the pressing portion to be in contact with the metal bracket.

2. The bracket assembly of claim 1, wherein the metal bracket comprises a plurality of sidewalls connected end to end to form an accommodate space to accommodate the electronic components, and the pressing portion is resiliently against the plurality of sidewalls.

3. The bracket assembly of claim 2, wherein the at least one spring module comprises a plurality of spring modules distributed around the plurality of sidewalls, and each of the plurality of spring modules is located adjacent to one of the plurality of sidewalls.

4. The bracket assembly of claim 2, wherein the pressing portion comprises a contact point protruding out of the pressing portion, and the pressing portion is resiliently against the plurality of sidewalls through the contact point.

5. The bracket assembly of claim 4, wherein the number of the plurality of sidewalls is even, and the plurality of spring modules is symmetrically distributed on each two opposite sidewalls and contacts the plurality of sidewalls through the contact point.

6. The bracket assembly of claim 1, wherein the fixing portion comprises a base plate and a plurality of bent ends perpendicular with the base plate.

7. The bracket assembly of claim 6, wherein the at least one spring module comprises a limit portion located at one end of the base plate, a limit end of the pressing portion is accommodated in the limit portion, and the elastic portion is formed on a free end of the pressing portion.

8. The bracket assembly of claim 6, further comprising a main plate around the metal bracket, the at least one spring module is sandwiched between the main plate and the metal bracket, and the metal bracket is grounded through the main plate.

9. The bracket assembly of claim 8, wherein the main plate defines a plurality of limit holes, and the plurality of bent ends are inserted into the plurality of limit holes.

10. The bracket assembly of claim 1, further comprising a middle frame, the middle frame defines a plurality of slots, and the metal bracket comprises a plurality of fixing blocks engaged with the plurality of slots.

11. The bracket assembly of claim 1, wherein the elastic portion is a bent structure, and the elastic portion bends toward a direction away from the fixing portion.

12. A camera module comprising:
a bracket assembly, wherein the bracket assembly comprises:
a metal bracket;
a spring module, wherein the spring module is grounded, and comprises a fixing portion, a pressing portion, and a elastic portion; the fixing portion is fixed in the mobile terminal and grounded, and the elastic portion connects the pressing portion and the fixing portion; the elastic portion is configured to provide a restoring force to the pressing portion, and press the pressing portion to be in contact with the metal bracket; and
a dual-camera component, wherein the dual camera component is fixed in the bracket assembly.

13. The camera module of claim 12, wherein the dual-camera component is embedded in the metal bracket.

14. The camera module of claim 12, wherein the dual-camera component comprises a first imaging lens and a second imaging lens disposed side by side, and fixed in the metal bracket.

15. The camera module of claim 14, wherein the metal bracket defines an accommodated space, and the first imaging lens and the second imaging lens are mounted in the accommodating space.

16. The camera module of claim 14, wherein a first main imaging optical axis of the first imaging lens and a second main imaging optical axis of the second imaging lens are parallel with each other.

17. The camera module of claim 12, wherein the bracket assembly further comprises a main plate and a middle frame, the dual-camera component is fixed to the in the middle frame through the metal bracket, and the metal bracket is fixed to the main plate through the spring module.

18. The camera module of claim 17, further comprising a cover engaged with the middle frame, wherein the main plate, the metal bracket, the spring module and the dual-camera component are sandwiched between the cover and the middle frame.

19. The camera module of claim 18, wherein the dual-camera component is surrounded by the metal bracket, and the spring module is sandwiched between the metal bracket and the main plate to fix the dual-camera component.

20. A mobile terminal comprising:
a shell;
a dual-camera module assembled in the shell, wherein the dual-camera module comprises:
a bracket assembly, wherein the bracket assembly comprises:
a metal bracket;
a spring module, wherein the spring module is grounded and in contact with the metal bracket, and the metal bracket is fixed by the spring module; and
a dual-camera component, wherein the dual camera component is fixed in the bracket assembly.

* * * * *